July 20, 1948.　　　S. DE ORLOW　　　2,445,474
CABLE CLAMPING DEVICE
Filed March 23, 1944
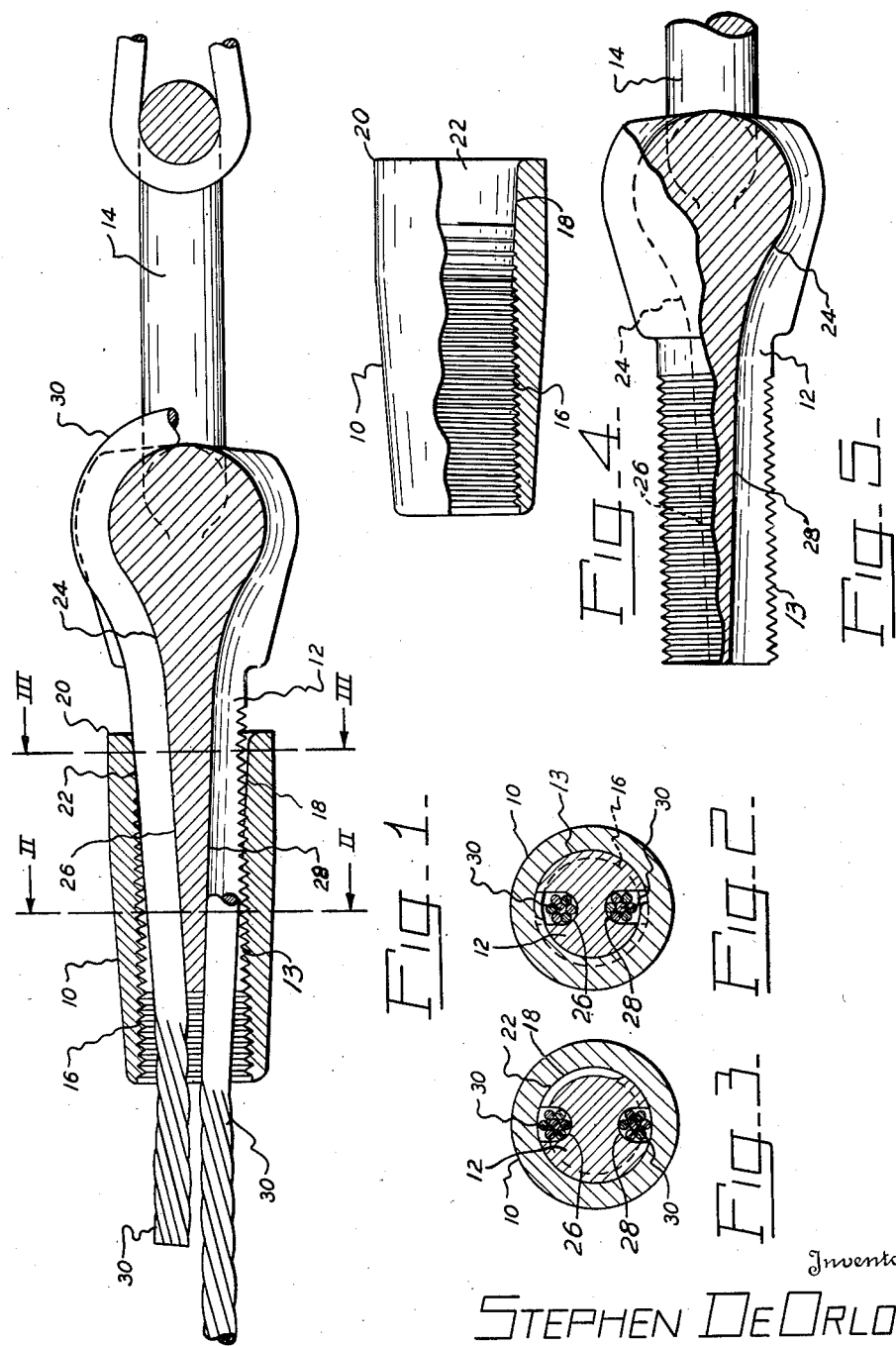
Inventor
STEPHEN DE ORLOW Patented July 20, 1948

2,445,474

UNITED STATES PATENT OFFICE 2,445,474

CABLE CLAMPING DEVICE

Stephen De Orlow, Jackson, Mich.

Application March 23, 1944, Serial No. 527,772

2 Claims. (Cl. 24—124)

The present invention relates to improvements in devices employed to secure flexible cables to terminal devices, such as eye bolts, snaps, turnbuckles, and the like.

One of the objects of the present invention is to provide a cable terminal capable of meeting rigid aircraft specifications and characterized by being vibration proof and of such a design as to permit the employment of high compressive forces without impairing the strength of the cable.

A further object is to provide an improved cable terminal consisting of telescoping parts having threading engagement with each other, with the cable clamped between complementary tapered surfaces.

A further object of the invention is to provide a cable terminal in the form of two telescoping parts having threaded engagement, with tapered complementary surfaces between which the returned end portions of the cable are secured.

The above and other objects and advantages residing in the arrangement, combination and construction of parts will be hereinafter more fully set forth and will become apparent from a consideration of the annexed claims.

In the drawing, wherein one form of the invention is illustrated,

Fig. 1 is an assembly shown in vertical longitudinal section,

Fig. 2 is a cross-sectional view of the cable through the cable terminal assembly, taken on line II—II of Fig. 1, Fig. 3 is a cross-sectional view taken on line III—III of Fig. 1, Fig. 4 is a view in side elevation and partly longitudinal section of a female portion of the cable terminal, and Fig. 5 is a view in side elevation and partly longitudinal section of the male portion of the terminal assembly.

As shown in Fig. 1, the cable terminal consists of a female part 10 and a male part 12 threaded at 13 which may carry an integral eye or other structural portion 14. In production the female part 10 is threaded throughout its length, as at 16, and thereafter a tapered reamer provides a conical wall 18 at the forward end 20. Preferably the length in taper of the wall 18 is sufficient to remove material below the root of the thread so as to give a relatively smooth surface of substantial length as at 22.

The male part 12 has a return bent channel 24 which includes diametrically located converging portions 26 and 28. The angularity of the diametrically disposed portions of the channel 24 is such that the cable 30 when return bent upon the male part 12 has clearance with respect to the threaded portion 16 on the female part 10, but is capable of being compressed by the tapered wall portion 22 at the time the parts 13 and 16 of the male and female parts are threaded together. It is to be understood that the diameter of the cable 30 is somewhat greater than the depth of the groove 24, at least in the locality of the conical portion 18. In practice satisfactory results have been obtained having the angularity of the portions 26 and 28 of the groove 24 correspond to the angularity of the conical portion 18.

It should be apparent from the foregoing description that, with the cable return bent on the male part 12 and located in the groove 24, as shown in Fig. 1, relative rotation between the parts 10 and 12 will result in the parts 10 and 12 being drawn together to a point at which the cable 30 is compressed between the smooth surface 22 of the conical part 18 and the converging portions 26 and 28 of the groove 24 to firmly hold the cable 30 in position. It will be understood that no part of the cable 30 is being pressed by the threaded portion of the nipple 10, the point of compression being along the conical, relatively smooth surface 22 of the portion 18 of the nipple 10 and the smooth converging portions 26 and 28 of the bottom of the groove 24. With this arrangement there is no chaffing or shearing of any of the strands of the cable 30, with resulting detriment to the strength of the cable. Moreover the arrangement is such that both the cable and the terminal parts 10 and 12 may be subjected to repeated use, as for example, where it is desirable to take up slack or adjust the length of the cable by changing the position of the cable terminal.

With my improved device constructed and employed in the manner set forth, there will be sufficient clamping and binding force exerted between the female part 10 and the male part 12 to secure and hold the cable 30 against slipping or loosening or slacking off, since the cable is gripped and clamped and is firmly held between the parts 10 and 12. At the same time there is sufficient binding and frictional engagement between the surface 22 of the female member 10 and the two clamped portions of the cable 30 to hold and frictionally secure the female member against accidental or casual turning and loosening or displacement or backing off from the threaded end of the male part, due to vibration or other forces or causes ordinarily encountered in and under conditions of use. However, by employement of a proper tool the female part 10 can be rotated to unscrew the part 10 from the male part 12 when sufficient force is applied to overcome the frictional engagement of the surface 22 with the oppositely disposed portions of the cable 30; and due to the fact that the female part is an integral one-piece structure, this rotational movement to unscrew the female part 10 from the threaded portion of the male part 12 will cause the end 20 to be retracted so that the surface 22 will be drawn away from the clamping position. Thus, the single operation of rotating the female member 10 will withdraw this unitary member, and the tapered surfaces at 18 and 22 from the cable clamping position.

Having thus described my invention, what I desire to secure by Letters Patent and claim is:

1. A cable terminal assembly comprising a one-piece unitary female part having a screw-threaded opening of substantially uniform diameter at one end and a conical flaring internally smooth walled portion at the other end, and a male part having threaded portions engaging the screw threads in the female part and provided with an axially extending inclined groove on one side, the depth of which in the area embraced by the flaring portion of the female member being less than the diameter of the cable to be engaged, whereby the cable is adapted to be compressed within the groove of the male member and against the conical portion of the female member when said parts are threaded together and the clamping portion of the female member is positively withdrawn from such clamping relation with the cable when the parts are threaded apart.

2. A cable terminal comprising a unitary one-piece female part having a cylindrical threaded wall portion of substantially uniform diameter at one end and opening into a flaring conical portion at its other end, said conical portion being provided with a smooth inner clamping wall, and a male part having a substantially cylindrical externally threaded portion adapted to receive the cylindrical threaded portion of said female part, and said male part having axially extending inclined grooves on substantially diametrically opposite sides thereof with the depth of said grooves beyond the threaded cylindrical portion being less than the diameter of a cable to be clamped, whereby when portions of a cable are placed in said grooves and the female member is threaded onto the threaded portion of the male member, the threads of the female member will be out of contact with the cable and the cable will be clamped and secured held within the portions of the groove of less depth and will be confined and clamped by the flaring smooth walled portion of the female part.

STEPHEN DE ORLOW.

REFERENCES CITED

The following references are of record in the file of this patent:

UNITED STATES PATENTS

| Number | Name | Date |
|---|---|---|
| 356,106 | Dumas | Jan. 18, 1887 |
| 1,010,301 | Neats | Nov. 28, 1911 |
| 1,388,664 | Officer | Aug. 23, 1921 |
| 1,429,371 | Shaffer | Sept. 19, 1922 |
| 2,296,567 | Nielsen | Sept. 22, 1942 |

FOREIGN PATENTS

| Number | Country | Date |
|---|---|---|
| 7,820 | Great Britain | 1903 |
| 417,477 | France | Mar. 15, 1910 |